(12) United States Patent
Javor et al.

(10) Patent No.: US 8,170,518 B2
(45) Date of Patent: May 1, 2012

(54) DUAL ANTENNA SYSTEM HAVING ONE PHASE LOCK LOOP

(75) Inventors: Ronald D. Javor, Phoenix, AZ (US); Malcolm H. Smith, Phoenix, AZ (US); Nir Binshtok, Tel Aviv (IL); Eran Segev, Tel Aviv (IL)

(73) Assignee: Marvell World Trade Ltd., St. Michael (BB)

( * ) Notice: Subject to any disclaimer, the term of this patent is extended or adjusted under 35 U.S.C. 154(b) by 834 days.

(21) Appl. No.: 12/048,033

(22) Filed: Mar. 13, 2008

(65) Prior Publication Data
US 2008/0166988 A1 Jul. 10, 2008

Related U.S. Application Data

(63) Continuation of application No. 10/430,083, filed on May 5, 2003, now Pat. No. 7,398,068.

(51) Int. Cl.
*H04B 1/06* (2006.01)
*H04B 7/00* (2006.01)

(52) U.S. Cl. ........... 455/260; 455/272; 455/293; 330/66

(58) Field of Classification Search .......... 455/260, 455/272, 293, 323, 324, 208, 209; 330/66
See application file for complete search history.

(56) References Cited

U.S. PATENT DOCUMENTS

| | | | |
|---|---|---|---|
| 3,614,625 A | 10/1971 | Mayle, Jr. | |
| 4,095,190 A * | 6/1978 | Imazeki et al. | 331/2 |
| 4,406,017 A | 9/1983 | Takahashi | |
| 4,520,507 A | 5/1985 | Moon | |
| 5,535,440 A | 7/1996 | Clappier | |
| 5,742,896 A | 4/1998 | Bose et al. | |
| 5,835,850 A * | 11/1998 | Kumar | 455/67.14 |
| 6,335,952 B1 | 1/2002 | Lee et al. | |
| 6,411,660 B1 | 6/2002 | Oh | |
| 6,785,529 B2 | 8/2004 | Ciccarelli et al. | |
| 6,871,052 B2 | 3/2005 | Spencer et al. | |
| 7,174,165 B2 * | 2/2007 | Lee | 455/422.1 |
| 7,450,963 B2 * | 11/2008 | Krishnan et al. | 455/557 |
| 2002/0025778 A1 * | 2/2002 | Lee | 455/3.05 |
| 2003/0215027 A1 * | 11/2003 | Yu et al. | 375/316 |
| 2004/0017847 A1 * | 1/2004 | Alberth et al. | 375/219 |

(Continued)

FOREIGN PATENT DOCUMENTS

CN 1328723 A 12/2001

(Continued)

OTHER PUBLICATIONS

PCT Search Report dated Oct. 10, 2004.

(Continued)

*Primary Examiner* — Christian Hannon

(57) ABSTRACT

Circuits, systems, and methods are disclosed for controlling multiple antenna receive paths in a wireless communication device. In some embodiments, the circuit may include a pair of receiving antennas, a first receive path including a VCO coupled to receive a PLL signal and a first mixer coupled to receive a first signal from the VCO and a signal from one of the antennas, and a second receive path integrated separately from the first receive path including a second mixer coupled to receive a second signal from the VCO and a signal from the other antenna. By utilizing the output of the VCO to tune the first and second mixers in the first and second receive paths to the same phase and frequency, control of the multiple antenna receive paths may be optimized.

14 Claims, 4 Drawing Sheets

U.S. PATENT DOCUMENTS

2005/0118973 A1    6/2005    Khlat

FOREIGN PATENT DOCUMENTS

| | | | |
|---|---|---|---|
| EP | 0333419 | A | 9/1989 |
| EP | 1274210 | A1 | 1/2003 |
| JP | 56125122 | A | 10/1981 |
| KR | 1999-011052 | | 8/2007 |
| WO | WO 00/31885 | | 6/2000 |

OTHER PUBLICATIONS

Office action for Korean Patent Application No. 2005-7020922.
Office action for Chinese Patent Application No. 2004 80011899.1 issued Jun. 8, 2007.

* cited by examiner

US 8,170,518 B2

DUAL ANTENNA SYSTEM HAVING ONE PHASE LOCK LOOP

RELATED APPLICATIONS

This application is a continuation of U.S. patent application Ser. No. 10/430,083, filed May 5, 2003, now U.S. Pat. No. 7,398,068 which is herein incorporated in its entirety by reference.

BACKGROUND

Some wireless systems use a single antenna for transmission and reception while some products incorporate multiple antennas. Smart-antenna systems may make use of multiple antennas working simultaneously in time and frequency. For instance, multiple antennas may provide simultaneous reception of modulated signals, where separate receive paths with mixers and local oscillators are used to frequency translate the modulated signals to baseband signals.

For smart-antenna systems there is a continuing need for better ways to control multiple antenna receive paths.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
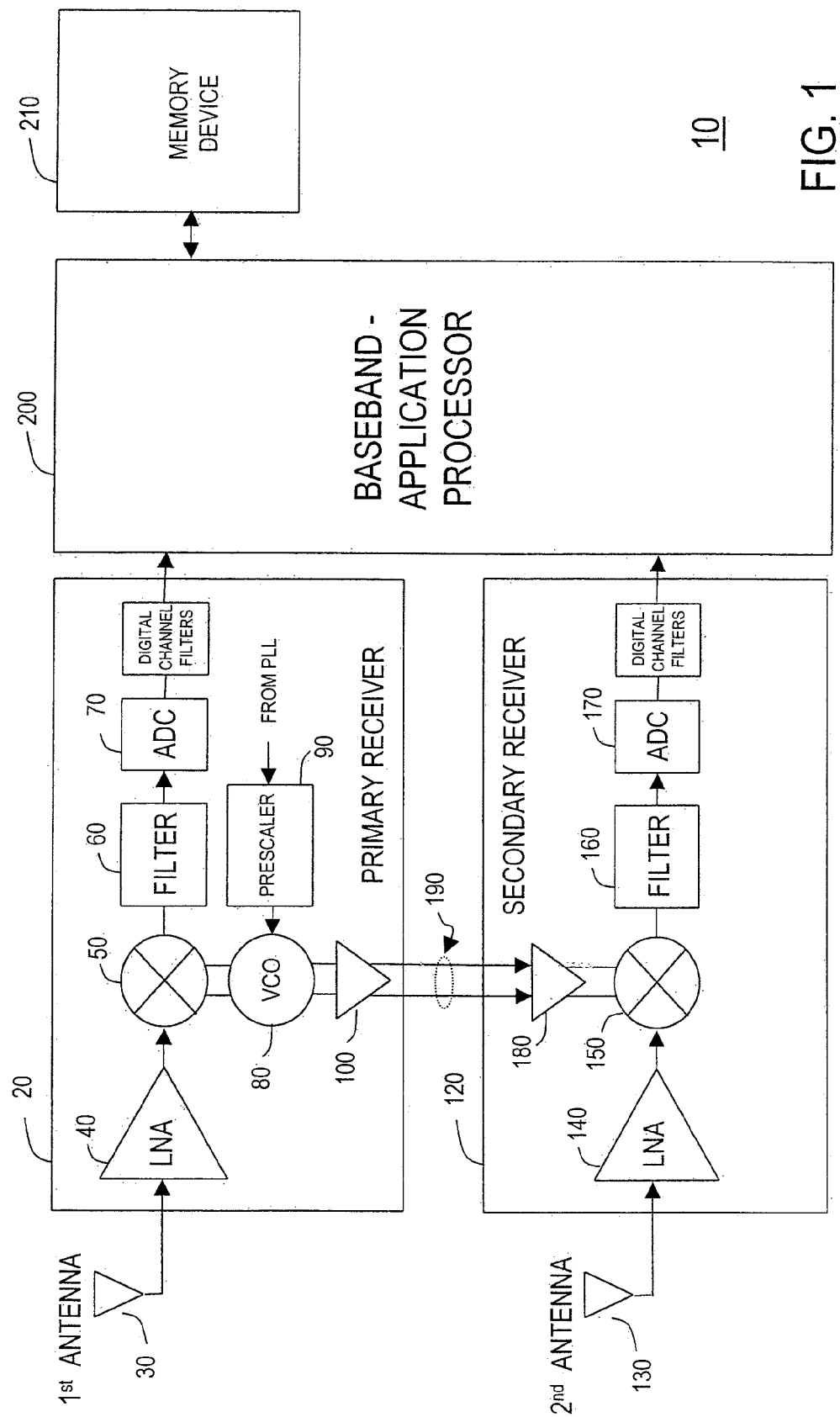
FIG. 1 illustrates features of the present invention that may be incorporated into a wireless communications device having a primary receiver and a separate secondary receiver.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates features of the present invention that may be incorporated into a wireless communications device 10 such as, for example, a Global System for a Mobile Communications (GSM) portable handset. Although the receiver is shown as a direct conversion receiver, other types of receivers such as a super-heterodyne receiver are included and the type of receiver is not limiting to the present invention. Further, for simplicity the circuits have been described as providing differential signals but it should be understood that single-ended signals may be used without limiting the claimed subject matter.

The transceiver either receives or transmits a modulated signal from multiple antennas 30 and 130. Shown is a primary receiver 20 having a Low Noise Amplifier (LNA) 40 connected to antenna 30 for amplifying the received signal. A mixer 50 translates the carrier frequency of the modulated signal, down-converting the frequency of the modulated signal in the primary receiver. The down-converted, baseband signal may be filtered through a filter 60 and converted from an analog signal to a digital representation by an Analog-To-Digital Converter (ADC) 70. The digital representation may be passed through digital channel filters prior to being transferred to a baseband and application processor 200. In primary receiver 20, mixer 50 is further connected to a Voltage Controlled Oscillator (VCO) 80 to receive an oscillator signal. The frequency of the signal provided by this local oscillator is determined by a prescaler 90 in dividing down a signal generated by a Phase Lock Loop (PLL).

The transceiver further includes a secondary receiver 120 having a Low Noise Amplifier (LNA) 140 connected to antenna 130 that amplifies the received signal. A mixer 150 provides frequency translation of the carrier in the modulated signal. With the frequency of the modulated signal down-converted in the second receiver 120, the baseband signal may be filtered through a filter 160 and converted from an analog signal to a digital representation value by an Analog-To-Digital Converter (ADC) 170. The digital representation value may be passed through digital channel filters prior to being passed to a baseband and application processor 200. The processor is connected to primary receiver 20 and to secondary receiver 120 to provide, in general, the digital processing of the received data within communications device 10.

The principles of the present invention may be practiced in wireless devices that are connected in a Code Division Multiple Access (CDMA) cellular network such as IS-95, COMA 2000, and UMTS-WCDMA and distributed within an area for providing cell coverage for wireless communication. Additionally, the principles of the present invention may be practiced in Wireless Local Area Network (WLAN), WAN, Personal Area Network (PAN), 802.11, Orthogonal Frequency Division Multiplexing (OFDM), Ultra Wide Band (UWB), and GSM, among others.

A memory device 210 may be connected to processor 200 to store data and/or instructions. In some embodiments, memory device 210 may be volatile memories such as, for example, a Static Random Access Memory (SRAM), a Dynamic Random Access Memory (DRAM) or a Synchronous Dynamic Random Access Memory (SDRAM), although the scope of the claimed subject matter is not limited in this respect. In alternate embodiments, the memory devices may be nonvolatile memories such as, for example, an Electrically Programmable ReadOnly Memory (EPROM), an Electrically Erasable and Programmable Read Only Memory (EEPROM), a flash memory (NAND or NOR type, including multiple bits per cell), a Ferroelectric Random Access Memory (FRAM), a Polymer Ferroelectric Random Access Memory (PFRAM), a Magnetic Random Access Memory (M.RAM), an Ovonics Unified Memory (OUM), a disk memory such as, for example, an electromechanical hard disk, an optical disk, a magnetic disk, or any other device capable of storing instructions and/or data. However, it should be understood that the scope of the present invention is not limited to these examples.

The analog front end that includes primary receiver 20 and secondary receiver 120 may be embedded with processor 200 as a mixed-mode integrated circuit. Alternatively, primary receiver 20 and secondary receiver 120 may be a stand-alone Radio Frequency (RF) integrated analog circuit that includes low noise amplifiers, mixers, digital filters and ADCs. In yet another embodiment having a different partitioning of elements, the analog circuit may include low noise amplifiers and mixer(s), while the filters and ADCs may be included with the baseband processor. Accordingly, embodiments of the present invention may be used in a variety of applications, with the claimed subject matter incorporated with/into microcontrollers, general-purpose microprocessors, Digital Signal Processors (DSPs), Reduced Instruction-Set Computing (RISC), Complex Instruction-Set Computing (CISC), among other electronic components. In particular, the present invention may be used in smart phones, communicators and Personal Digital Assistants (PDAs), base band and application processors, medical or biotech equipment, automotive safety and protective equipment, and automotive infotainment products. However, it should be understood that the scope of the present invention is not limited to these examples.

The dual-antenna receiver in wireless communications device 10 uses at least two distinct receiver chains. In the embodiment that places the individual receiver chains on separate integrated circuits, a single synthesizer drives mixer 50 in one receiver chain in primary receiver 20 and further drives mixer 150 in another receiver chain in secondary receiver 120. The two distinct receiver chains on separate chips are used to implement a dual-antenna receiver based on a direct down conversion architecture. Thus, with VCO 80 located within primary receiver 20, the signals from the VCO are transferred through a differential output buffer, e.g. amplifier 100, to external terminals. The inputs of a differential input buffer, e.g., amplifier 180, are connected to input terminals on secondary receiver 120, and coupled to receive signals from VCO 80 via traces 190. Thus, amplifier 100 interfaces VCO 80 on primary receiver 20 to the external environment, and to amplifier 180 on secondary receiver 120. The physical traces 1-90 external to the receivers should provide an environment having low noise and low signal loss. Again, the use of differential output and input amplifiers 100 and 180 allow a single VCO to drive mixers on two separate integrated circuits that may be used to implement a dual-antenna receiver, based on direct-down conversion architecture.

Figure 2:
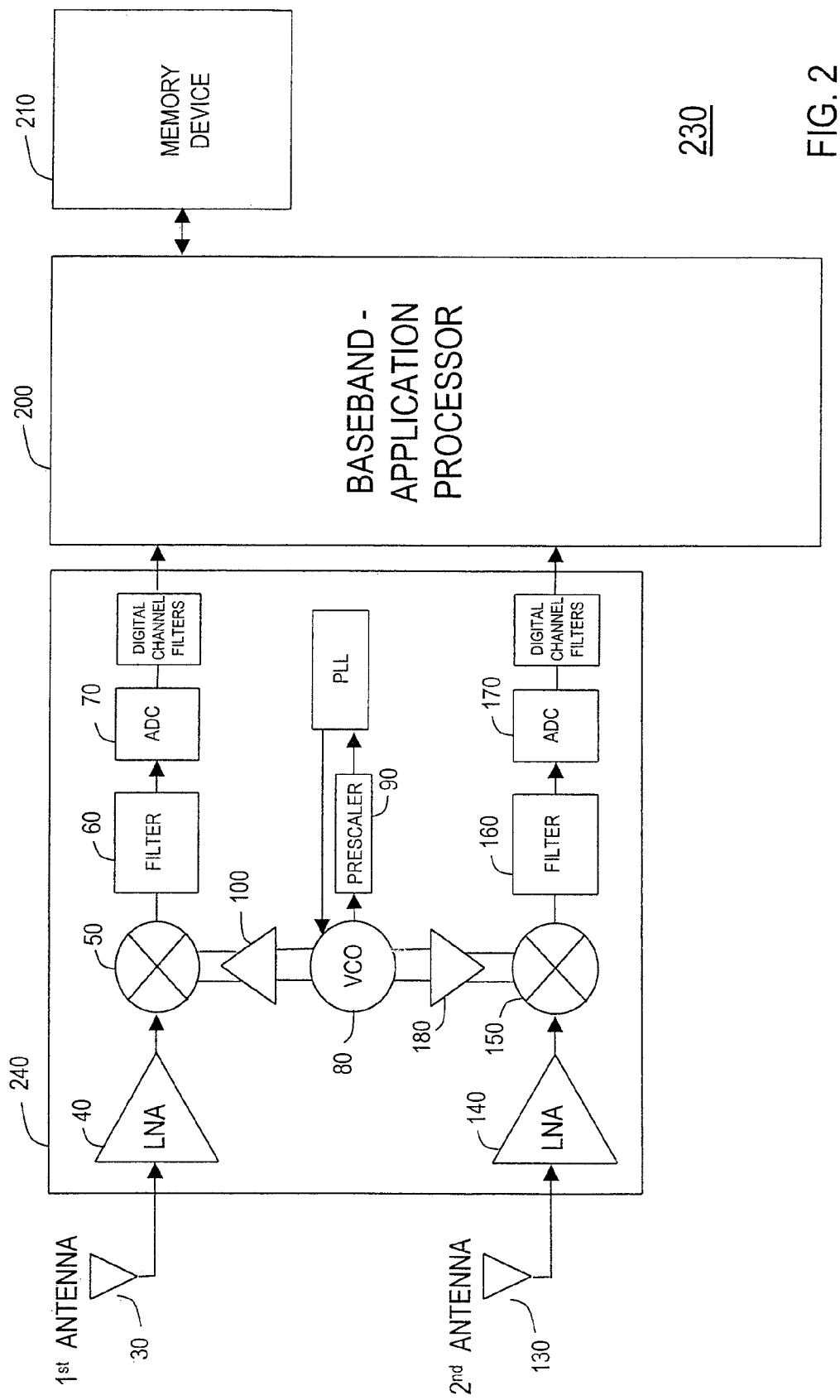
FIG. 2 illustrates a dual-antenna receiver that uses a single Voltage Controlled Oscillator (VCO) driving two mixers in a wireless communications device.

FIG. 2 illustrates features of the present invention that may be incorporated in a dual-antenna receiver 240 that uses at least two distinct receiver chains in a wireless communications device 230. In this embodiment the first receiver chain includes antenna 30, LNA 40, mixer 50, filter 60, ADC 70 and the digital channel filters. The second receiver chain includes antenna 130, LNA 140, mixer 150, filter 160, ADC 1-70 and the digital channel filters. In this embodiment both receiver chains are integrated together onto the same integrated circuit that further includes a VCO 80. VCO 80 is separated from mixers 50 and 150 by respective amplifiers 100 and 180. Note that VCQ 80 is coupled to a Phase Lock Loop (PLL) that may or may not be integrated with dual-antenna receiver 240. Further note that in one embodiment, dual-antenna receiver 240 may be integrated with processor 200 onto a single chip.

Dual-antenna receiver 240 provides an area and power efficient implementation of a direct-down conversion architecture having only one synthesizer to drive the mixers of both receiver chains. In this embodiment, one PLL drives VCO 80, with feedback from the VCO through a prescaler 90 to the PLL. Buffer amplifiers 100 and 180 couple the VCO signals to the respective mixers 50 and 150 of each receiver chain, where the buffer amplifiers provide additional isolation between the two receiver chains.

With reference to FIGS. 1 and 2, the first receiver chain that includes antenna 30, LNA 40, mixer 50, filter 60, ADC 70 and digital channel filters may operate in an active mode to receive a signal and provide processor 200 with quadrature signals. Likewise, the second receiver chain that includes antenna 130, LNA 140, mixer 150, filter 160, ADC 170 and digital channel filters may operate in an active mode to receive a signal and provide processor 200 with quadrature signals. However, both receive chains may be inactive for periods of time and then independently selected and enabled.

Figure 3:
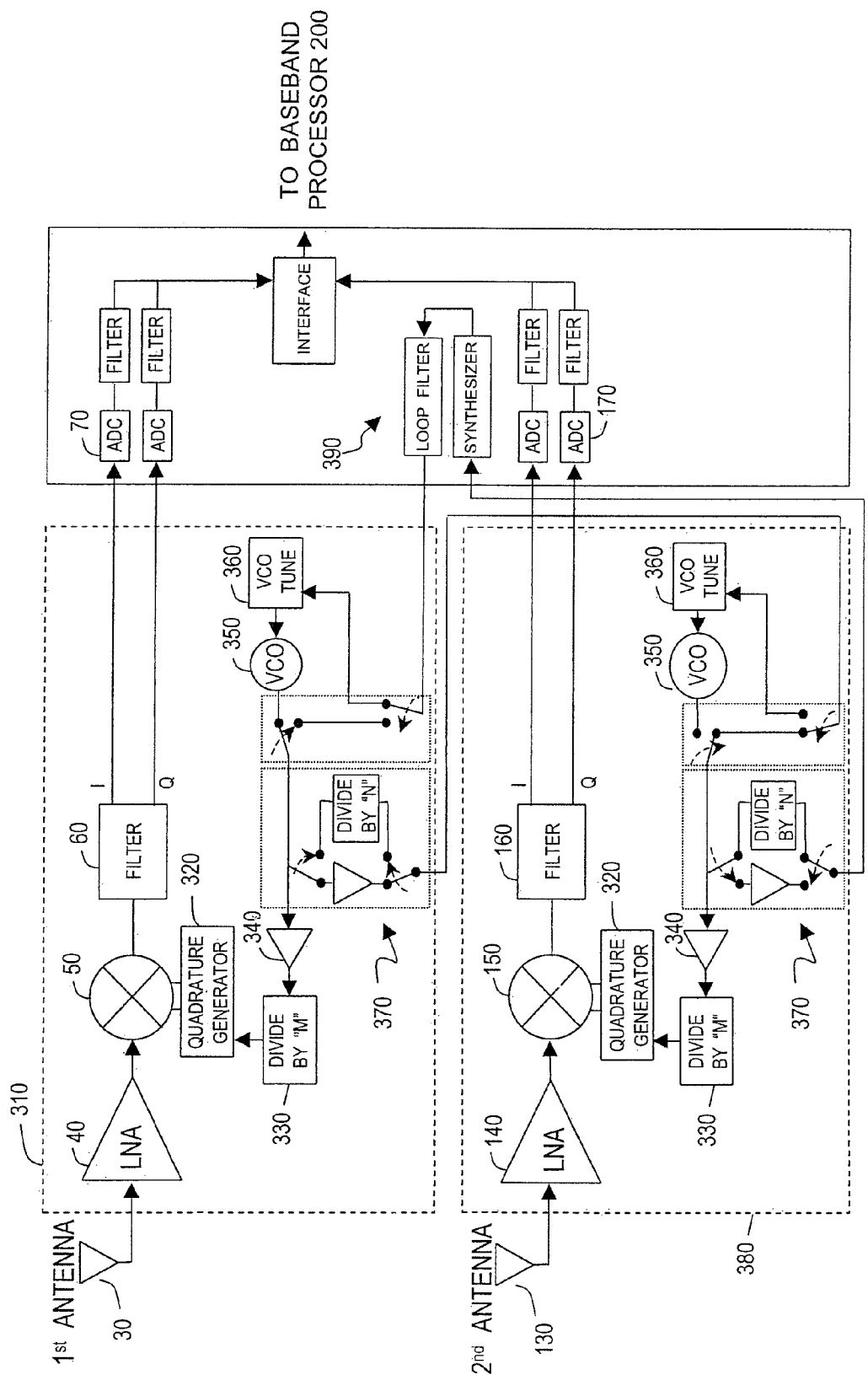
FIG. 3 illustrates an embodiment that supports a full dual receive path for a wireless device having one synthesizer that drives two receive VCOs.

FIG. 3 illustrates an embodiment that supports a full dual receive path for a wireless device such as, for example, a GSM hand set having one synthesizer that drives two receive VCOs. A first receiver path in receiver portion 310 includes antenna 30, LNA 40, mixer 50, filter 60, and ADC 70 and a second receiver path in receiver portion 380 includes antenna 130, LNA 140, mixer 150, filter 160 and ADC 170. A closed loop synthesizer or PLL 390 sets the frequency of the signal used to down convert the received RF signals. In each receiver portion there are multiplexers that define the signal provided to divider 330 and define whether the loop-back signal to PLL 390 will be divided by N.

Receiver portions 310 and 380 include internal circuitry 370, where switches or multiplexers may be set to allow one receiver portion to operate as a master and the other receiver portion to operate as a slave. In the embodiment shown, receiver portion 310 operates as a master and receiver portion 380 is set to operate as a slave. Accordingly, loop synthesizer 390 provides a signal that is received by VCO 350 in the master (receiver portion 310). That same VCO 350 in the master provides a reference signal to buffer 340 in the slave (receiver portion 380). The reference signal is divided (see DIVIDE BY "N" with reference number 370 in the slave chip) and returned to loop synthesizer 390 to close the loop.

In operation, two receive paths may be operational and sending quadrature I and Q signals that may be converted from analog to digital representative values by the ADCs 70. However, in order to save current and reduce operating power, either receiver portion 310 or receiver portion 380 may be configured as a slave receive path by appropriately setting the switches in circuitry 370. In this case the slave receive path may be used to divide the master VCO signal by N and close the synthesizer loop. The master/slave operation and the one antenna operation within dual antenna configuration are controlled via command(s) from the baseband processor. The command may be written to internal registers (not shown) and changed during operation. Thus, the same chipset may selectively provide a two receive path solution and a one receive path solution.

It should be noted that in an alternative embodiment, the I and Q signals from filters 60 may be multiplexed into the ADCs 70. The multiplexer at the input to ADC 70 would select one analog signal and a sample-and-hold buffer on the output of the ADC would maintain the digital value representative of the selected analog input signal. The multiplexer would be switched between the input paths fast enough (at least double the sampling rate) to successfully sample the incoming signal. In case only one path is functional the switches would be positioned to support the functional path. Thus, the ADCs may be double clocked and multiplexed so that the first and second ADCs and corresponding first and second filters may be used to support two receive paths.

Figure 4:
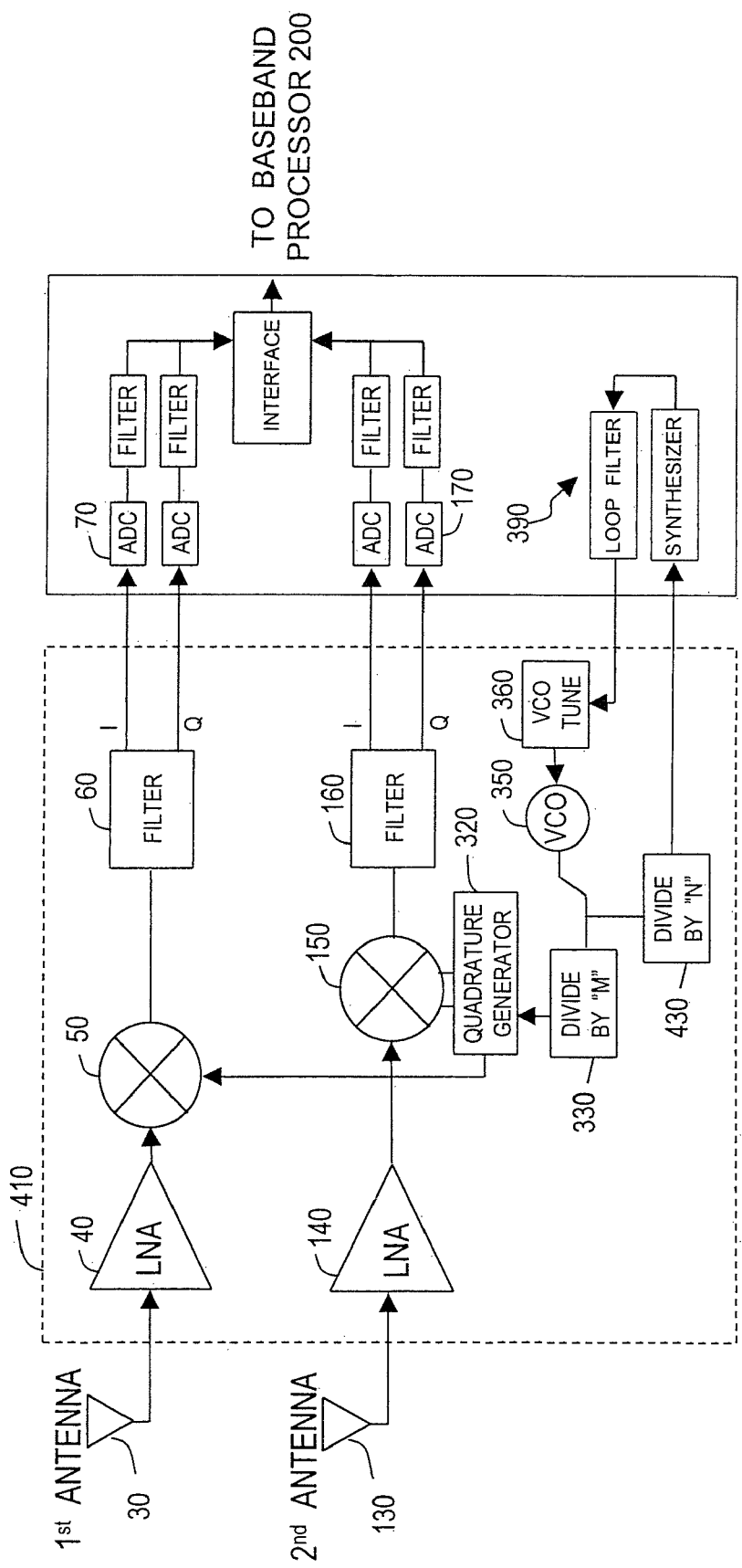
FIG. 4 illustrates an embodiment that supports a full dual receive path for a wireless device having one synthesizer that drives one receive VCO.

FIG. 4 illustrates another embodiment that supports a full dual receive path for a wireless device such as, for example, a Global System for a Mobile Communications (GSM) hand set having one synthesizer that drives one receive VCO. A loop synthesizer 390 generates a signal that is supplied to VCO tune 360. VCO tune 360 controls the frequency of the oscillation signal in VCO 350. An output of VCO 350 is returned through DIVIDE BY "N" 430 to close the loop of loop synthesizer 390. VCO 350 also provides a signal to DIVIDE BY "M" 330 that drives quadrature generator 320. Differential output signals from quadrature generator 320 are supplied to both mixer 50 and mixer 150.

A first receiver path in receiver 410 includes antenna 30, LNA 40, mixer 50 and filter 60 that supply quadrature signals to ADCs 70 and a second receiver path includes antenna 130, LNA 140, mixer 150 and filter 160 that supply quadrature signals to ADCs 170. The loop synthesizer 390, VCO tune 360, VCO 350 and DIVIDE BY "N" 430 set the frequency of the signal used to down convert the received RF signals.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A circuit comprising:
   a first antenna and a second antenna;
   a first receive path comprising
      a Voltage Controlled Oscillator (VCO) configured to receive a Phase Lock Loop (PLL) signal, and
      a first mixer configured to receive (A) a first signal from the VCO and a signal from the first antenna; and
   a second receive path integrated separately from the first receive path, the second receive path comprising a second mixer that is configured to receive a second signal from the VCO and a signal from the second antenna,
   wherein the first signal from the VCO and the second signal from the VCO tunes the first mixer and the second mixer, respectively, to a same phase and frequency,
   wherein the first receive path and the second receive path are included in a first integrated circuit and a second integrated circuit, respectively.

2. The circuit of claim 1, wherein the first receive path further includes:
   a first amplifier having
      an input to receive a modulated signal, and
      an output coupled to the first mixer;
   a first filter coupled to an output of the first mixer; and
   an analog-to-digital converter having an input coupled to an output of the first filter.

3. The circuit of claim 1, wherein the second receive path further includes:
   a second amplifier having
      an input to receive a modulated signal, and
      an output coupled to the second mixer;
   a second filter coupled to an output of the second mixer; and
   an analog-to-digital converter having an input coupled to an output of the second filter.

4. The circuit of claim 1, further comprising:
   an output differential buffer integrated with the first mixer and the VCO, the output differential buffer to buffer the second signal provided to the second receive path.

5. The circuit of claim 4, further comprising:
   an input differential buffer integrated with the second mixer, the input differential buffer configured to receive the second signal that is supplied to the second mixer.

6. The circuit of claim 1, wherein the first and second receive paths receive data in a Global System for Mobile Communications (GSM) device.

7. A receiver circuit comprising:
   a first antenna and a second antenna;
   a first receive path comprising a first mixer, wherein the first mixer is configured to receive a signal from the first antenna;
   a second receive path comprising a second mixer, wherein the second mixer is configured to receive a signal from the second antenna; and
   a Voltage Controlled Oscillator (VCO) configured to (i) receive a Phase Lock Loop (PLL) signal and (ii) provide a first output signal and a second output signal, respectively, to the first mixer and the second mixer,
   wherein the VCO is separated from the second mixer by each of a first differential buffer and a second differential buffer.

8. The receiver circuit of claim 7, wherein each of the first receive path and the second receive path receive data in a Global System for a Mobile Communications (GSM) device.

9. The receiver circuit of claim 7 wherein the first receive path and the second receive path operate concurrently and are coupled to the VCO to respectively receive a first signal and a second signal at the same frequency.

10. A method comprising:
    receiving a first signal, from a first antenna, in a first receive path;
    receiving a second signal, from a second antenna, in a second receive path integrated separately from the first receive path;
    providing a Phase Lock Loop (PLL) signal to a Voltage Controlled Oscillator (VCO), wherein the VCO is included in the first receive path;
    mixing a VCO output signal with the first signal to generate a first mixed signal;
    providing the VCO output signal to terminals external to the first receive path; and
    mixing the signal provided to the terminals external to the first receive path with the signal received by the second antenna in the second receive path to generate a second mixed signal,
    wherein the first receive path and the second receive path are included in a first integrated circuit and a second integrated circuit, respectively.

11. The method of claim 10 further comprising buffering the VCO output signal in the first receive path.

12. The method of claim 10 further comprising buffering the VCO output signal in the second receive path.

13. The method of claim 10 further comprising:
    amplifying the first signal;
    filtering the first mixed signal in the first receive path; and
    digitizing the filtered first mixed signal in the first receive path.

14. The method of claim 10 further comprising:
amplifying the second signal;
filtering the second mixed signal in the second receive path; and
digitizing the filtered second mixed signal in the second receive path.

* * * * *